(12) United States Patent
Yagi

(10) Patent No.: US 7,148,489 B2
(45) Date of Patent: Dec. 12, 2006

(54) ULTRAVIOLET RAY MEASURING METHOD AND ULTRAVIOLET RAY MEASURING DEVICE

(75) Inventor: Shigeru Yagi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 253 days.

(21) Appl. No.: 10/961,197

(22) Filed: Oct. 12, 2004

(65) Prior Publication Data

US 2006/0076501 A1    Apr. 13, 2006

(51) Int. Cl.
*G01J 1/42* (2006.01)
(52) U.S. Cl. ...................................... 250/372
(58) Field of Classification Search .................. 250/372
See application file for complete search history.

(56) References Cited

U.S. PATENT DOCUMENTS

| 4,428,050 | A * | 1/1984 | Pellegrino et al. ........... 250/372 |
| 6,426,503 | B1 | 7/2002 | Wuest |
| 2003/0150998 | A1 | 8/2003 | Shin et al. |
| 2003/0218797 | A1 | 11/2003 | Kuklinski |
| 2005/0067580 | A1 * | 3/2005 | Fontaine ...................... 250/372 |
| 2005/0236576 | A1 * | 10/2005 | Yagi ............................ 250/372 |

FOREIGN PATENT DOCUMENTS

| DE | 19801454 A1 * | 7/1999 |
| JP | 2004317318 A * | 11/2004 |
| WO | WO 03/031921 A2 | 4/2003 |

* cited by examiner

*Primary Examiner*—David Porta
*Assistant Examiner*—Christopher Webb
(74) *Attorney, Agent, or Firm*—Oliff & Berridge, PLC

(57) ABSTRACT

An ultraviolet ray measuring method using an ultraviolet ray receiving element having a specific spectral sensitivity. The method includes: estimating an estimated value of an entire region from the spectral sensitivity of the ultraviolet ray receiving element and a solar spectral radiation spectrum; estimating an estimated value of a specific region from a specific action curve and the spectral sensitivity and the solar spectral radiation spectrum; and determining specific ultraviolet ray information by, on the basis of the estimated value of the entire region and the estimated value of the specific region, correcting an actually measured value which is measured by the ultraviolet ray receiving element. Further, specific ultraviolet information, which is obtained on the basis of sun altitude information, is also corrected.

17 Claims, 4 Drawing Sheets

ULTRAVIOLET RAY MEASURING METHOD AND ULTRAVIOLET RAY MEASURING DEVICE

BACKGROUND OF THE INVENTION

1. Field of the Invention

The present invention relates to a method and device which easily measure ultraviolet rays existing in a living environment. In further detail, the present invention relates to an ultraviolet ray measuring method and an ultraviolet ray measuring device which can acquire specific ultraviolet ray information such as, for example, the ultraviolet ray amount directly acting on a human body.

2. Description of the Related Art

One of the greatest global environmental problems in recent years is that the ultraviolet ray amount on the earth is increasing due to the destruction of the ozone layer. Ultraviolet rays have serious effects on health, such as the occurrence of skin cancer, an increase in photosensitivity due to damage to DNA, photoaging, and the like. The effects on skin which are problematic from a cosmetic standpoint, such as liver-spots, freckles, and the like, are also great.

The necessity to measure ultraviolet rays in the living environment is increasing from the standpoints of cosmetics, medicine, and the like.

In order to measure the ultraviolet ray amount, an ultraviolet ray gauging device used exclusively for such a purpose is needed. However, it is bothersome to carry such an exclusive-use UV gauging device around, and from this standpoint as well, it has conventionally not been possible to easily measure ultraviolet rays.

The effects of ultraviolet rays on organisms are varied. Therefore, there are various ways of expressing the ultraviolet ray amount, depending on what the measured ultraviolet rays mean. For example, there is a method of expressing the total ultraviolet ray amount (wavelength: about 290 to 400 nm), a method of measuring by using an ultraviolet ray sensor having sensitivity in only the UVA region (wavelength: about 320 to 400 nm), a method using an ultraviolet ray sensor having sensitivity in only the UVB region (wavelength: about 290 to 320 nm), and the like.

However, these ultraviolet ray sensors which measure ultraviolet rays do not have a characteristic matching the erythema curve which causes symptoms of sunburn of the skin, and do not have measured values which are delta-functionally obtained in the defined wavelength region, and are calibrated at a sensitivity to a representative wavelength within a specific spectral sensitivity curve. The index determined from the erythema curve is called the UV index.

The UV index is an amount of energy in which the weight of the erythema curve is applied to ultraviolet rays of one hour around noon. Generally, the UV index is quantitatively divided into ten numerical levels from solar ultraviolet rays, but is divided into 5 levels in common parlance suited to the senses of people.

The UV index is determined by applying a weight for each wavelength in the UVB region. Accordingly, no accurate value can be obtained other than by determining the UV index from the spectral illuminance. Measurement can only be carried out by using a large measuring device, and cannot be carried out easily. Further, with a measuring device having a spectral sensitivity matching the erythema ultraviolet rays, conversely, ultraviolet rays such as UVA and the like cannot be measured, and there is the problem that attention cannot be paid to ultraviolet rays which pass through windows and which have great cosmetic effects such as liver-spots, freckles, and the like.

Therefore, the current situation is that there is no method by which specific ultraviolet ray information can be easily measured, and improvements are desired.

SUMMARY OF THE INVENTION

The present invention provides an ultraviolet ray measuring method and an ultraviolet ray measuring device which make it possible to always easily and conveniently measure specific ultraviolet ray information with respect to a specific action curve from an actually measured value of an ultraviolet ray receiving element whose spectral characteristic is known in advance, and which can, at the same time, measure the total ultraviolet ray amount.

A first aspect of the present invention is an ultraviolet ray measuring method using an ultraviolet ray receiving element having a specific spectral sensitivity, the method including: estimating an estimated value of an entire region from the spectral sensitivity of the ultraviolet ray receiving element and a solar spectral radiation spectrum; estimating an estimated value of a specific region from a specific action curve and the spectral sensitivity and the solar spectral radiation spectrum; and determining specific ultraviolet ray information by, on the basis of the estimated value of the entire region and the estimated value of the specific region, correcting an actually measured value which is measured by the ultraviolet ray receiving element.

In the ultraviolet ray measuring method of the present invention, on the basis of the fact that the ratio of ultraviolet rays on the earth is not greatly affected by the weather, ultraviolet rays are measured by the ultraviolet ray receiving element, and correction is carried out by, for example, multiplying the actually measured value by the ratio of the estimated value of the entire region and the estimated value of a specific region. Therefore, simply and by a simple structure, and regardless of the weather, specific ultraviolet ray information can be acquired from within an actually measured value, and the entire amount of the ultraviolet rays can also be acquired at the same time.

In the wavelength distribution of ultraviolet rays transmitted through the stratosphere, the transmission distance through the ozone layer differs in accordance with the altitude of the sun. Therefore, by correcting the specific ultraviolet ray information on the basis of sun altitude information, ultraviolet ray information at an arbitrary sun altitude can be acquired. Therefore, specific ultraviolet ray information, which corresponds to a place and a date and time, can be acquired regardless of the weather.

In this way, the ultraviolet ray amount acting directly on a human body can be acquired. Note that, other than the erythema curve, an arbitrary action curve which is affected by ultraviolet rays, such as, for example, an action curve affecting DNA or the like, can be selected as the action curve.

A second aspect of the present invention provides an ultraviolet ray measuring device having: an ultraviolet ray receiving element having a specific spectral sensitivity; a storage mechanism storing an estimated value of an entire region estimated from the spectral sensitivity of the ultraviolet ray receiving element and a solar spectral radiation spectrum, and an estimated value of a specific region estimated from a specific action curve and the spectral sensitivity and the solar spectral radiation spectrum; and a correcting mechanism determining specific ultraviolet ray information by, on the basis of the estimated value of the entire region estimated from the spectral sensitivity of the ultraviolet ray receiving element and the solar spectral radiation spectrum, and the estimated value of the specific region estimated from the specific action curve and the spectral sensitivity and the solar spectral radiation spectrum, correcting an actually measured value which is measured by the ultraviolet ray receiving element.

In the ultraviolet ray measuring device of the present invention, as described above, it is possible to always easily and conveniently measure specific ultraviolet ray information with respect to a specific action curve from an actually measured value of an ultraviolet ray receiving element whose spectral characteristic is known in advance, and, at the same time, the total ultraviolet ray amount can be measured.

DETAILED DESCRIPTION OF THE INVENTION

Figure 1:
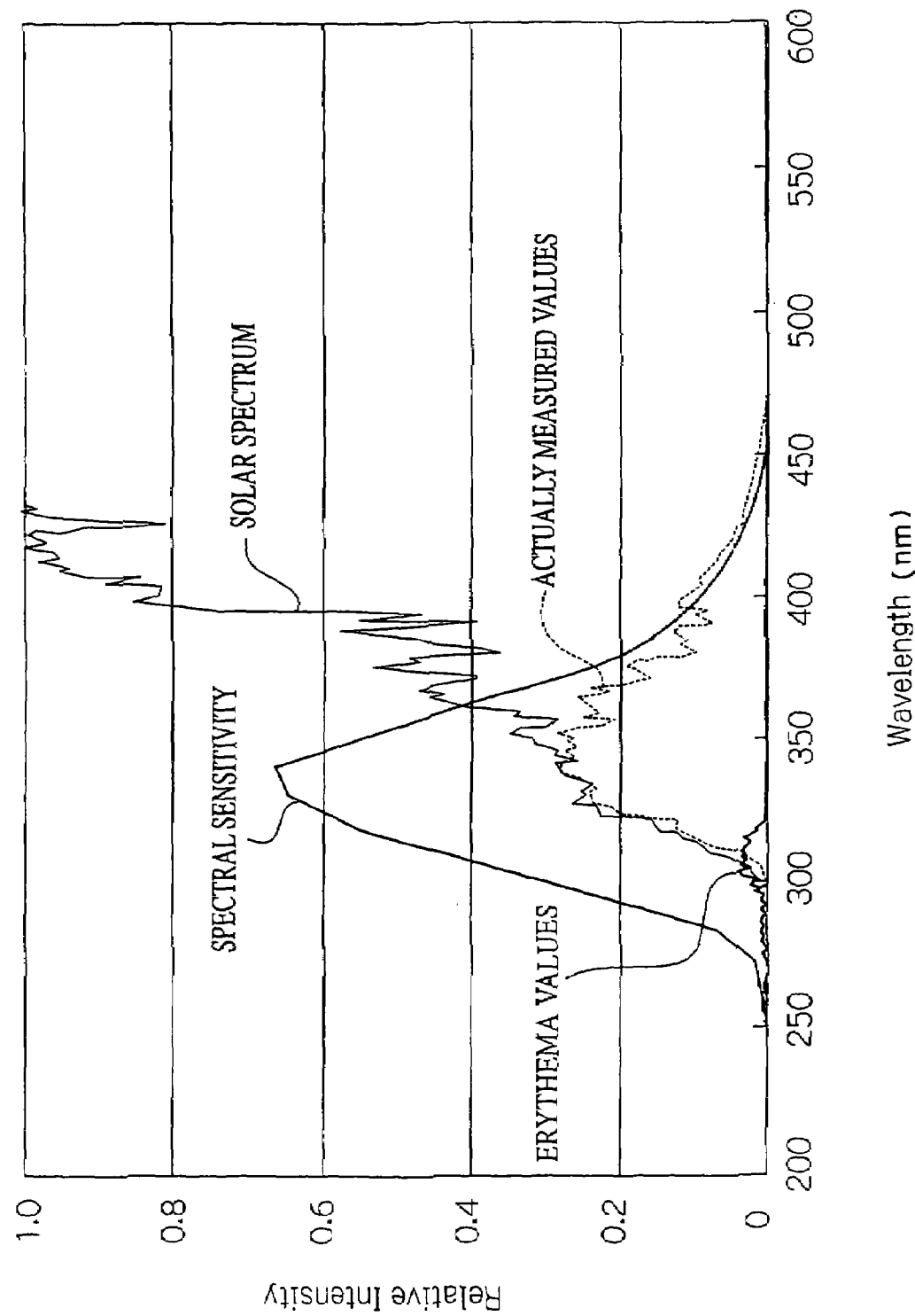
FIG. 1 is a graph showing actually measured values and erythema values of an ultraviolet ray receiving element, spectral sensitivity, and the solar spectrum, relating to an embodiment of the present invention.

Ultraviolet rays of sunlight reaching the earth (solar ultraviolet rays) have wavelengths longer than 200 nm due to absorption by oxygen. Further, the absorption by stratospheric ozone extends from 360 nm to 300 nm. Thereamong, absorption by ozone of ultraviolet rays of 320 nm or less is strong, and the ultraviolet rays of 320 nm or less are called UVB, and those of 400 to 320 nm are called UVA.

It has been reported that, in solar ultraviolet rays, the ratio of UVB and UVA is substantially constant at the same date and time, regardless of the weather. The UVB amount is determined in accordance with the absorbed amount traversing the ozone layer of the stratosphere. Thus, because ultraviolet rays on the earth have a narrow wavelength range, differences, in accordance with the wavelengths, in the scattering and reflection can be ignored, and it can be considered that the UVB amount is not greatly affected by the weather.

Accordingly, it is possible to determine ultraviolet ray information of a specific region by applying a weight, which is for each wavelength in the needed region, to an actually measured value (under the troposphere) measured by an ultraviolet ray element whose spectral sensitivity characteristic is known in advance (e.g., 200 nm to 700 nm), so as to effect correction by the ratio between the estimated value of the entire region of ultraviolet rays which is determined from the solar spectrum and spectral sensitivity, and the estimated value in a specific region of ultraviolet rays. Namely, for example, when the estimated value in a specific region is an estimated value in accordance with the erythema curve (an erythema ultraviolet ray estimated amount), the erythema ultraviolet ray amount is estimated from an actually measured value, and the UV index can be determined.

The UV index can be determined from the ultraviolet ray intensity which is determined by multiplying the spectral characteristic of the ultraviolet ray receiving element by the solar spectrum, and the ultraviolet ray intensity obtained by multiplying that measured ultraviolet ray intensity by the erythema curve as a weight, and the actually measured value.

Next, correction determining a specific ultraviolet ray measured value (specific ultraviolet ray information) $UV(\lambda)$ from an actually measured value UV0 will be described in detail.

First, the specific ultraviolet ray measured value $UV(\lambda)$ to be determined of a region having a specific action curve, is determined by $$UV(\lambda) = \Sigma F(\lambda) S(\lambda) R(\lambda) \qquad \text{formula (1)}$$

Here, F is the weight (e.g., the erythema curve), S is the spectral sensitivity of the ultraviolet ray receiving element, and R is the spectral radiation intensity of the sun.

Therefore, estimated value UV1 of the entire region, which is estimated from the solar spectrum and the spectral sensitivity of the ultraviolet ray receiving element, is expressed as follows given that $F(\lambda)=1$.

$$UV1 = \Sigma S(\lambda) R(\lambda) \qquad \text{formula (2)}$$

Estimated value UVF of a specific region, which is estimated from a specific action curve, the spectral sensitivity of the ultraviolet ray receiving element, and the solar spectral radiation spectrum, is expressed as follows.

$$UVF = \Sigma F(\lambda) S(\lambda) R(\lambda) \qquad \text{formula (3)}$$

By correcting the actually measured value by the ratio of the estimated value UV1 of the entire region and the estimated value UVF of the specific region, the ultraviolet ray measured value $UV(\lambda)$ is determined as follows.

$$UV(\lambda) = \text{actually measured value} \times \left(\frac{UVF}{UV1}\right) \qquad \text{formula (4)}$$
$$= \text{actually measured value} \times \left(\frac{\sum F(\lambda) S(\lambda) R(\lambda)}{\sum S(\lambda) R(\lambda)}\right)$$

Therefore, estimated value UVE (erythema ultraviolet ray estimated value UVE), which is estimated from the erythema curve and the spectral sensitivity and the solar spectral radiation spectrum, is determined as:

$$UVE = \Sigma E(\lambda) S(\lambda) R(\lambda) \qquad \text{formula (5)}$$

wherein $E(\lambda)$ is a weight in accordance with the erythema curve.

By correcting the actually measured value by the ratio of the estimated value UV1 of the entire region and the erythema ultraviolet ray estimated value UVE, the erythema ultraviolet ray amount (intensity) E is determined as follows.

$$E = \text{actually measured value} \times (UVE/UV1) \qquad \text{formula (6)}$$
$$= \text{actually measured value} \times \left(\frac{\sum E(\lambda) S(\lambda) R(\lambda)}{\sum S(\lambda) R(\lambda)}\right)$$

At this time, if $R(\lambda)$ is based on the spectral irradiance of summer, E substantially corresponds to the erythema ultraviolet ray amount of summer. This relationship is established even if the weather is other than fair, such as cloudy or rainy.

Next, description will be given of correction, by using the sun altitude, of the erythema ultraviolet ray amount E as the specific ultraviolet ray measured value UV(λ).

Sun Altitude and Transmission Distance of Ozone Layer

The ratio of intensities of ultraviolet rays of wavelengths shorter than 320 nm and ultraviolet rays of wavelengths longer than 320 nm is determined by the distance (the absorption length) at the time when the ultraviolet rays traverse the ozone layer of the stratosphere, namely, the absorption length which is determined from the sun altitude, i.e., the southing altitude in accordance with the month and date and the sun altitude in accordance with diurnal motion.

Accordingly, if the ozone density is assumed to be constant, provided that the date and time and the place (latitude) are known, the sun altitude can be determined, and the transmission distance of ultraviolet rays through the ozone layer can be estimated.

For example, in the case of Tokyo, the ratio UVB/UV near southing in the summer, which is determined from the spectral irradiance, and the ratio UVB/UV in winter are 5.5% and 3% in the case of direct arrival. Because the sun altitude is low in the morning, there are few short-wavelength ultraviolet rays, and the UVB/UV ratio is about 1% even in summer. Accordingly, if the entire UV amount can be stipulated from the date and time, the UVB amount can be estimated.

On the other hand, the erythema ultraviolet ray amount is further toward the short wavelength side than UVB, and the change in the ratio thereof is greater. The erythema ultraviolet ray amount can be estimated by determining the damping due to the distance of transmission through the atmosphere. Ultraviolet rays from the sun are damped by being absorbed by ozone in the stratosphere, and are affected by absorption, scattering, reflection and the like in the atmosphere condition of the troposphere. Differently than scattering due to air molecules (Rayleigh scattering), there is hardly any wavelength dependence of scattering due to clouds (Mie scattering).

The entire ultraviolet ray amount at this time can be expressed by actually measured value UV0 which is actually measured by an ultraviolet ray measuring element which measures approximately the entire ultraviolet ray region. For example, even on cloudy or rainy days, if the entire ultraviolet ray intensity is determined, the intensity of the ultraviolet rays of wavelengths shorter than 320 nm included therein can be determined from the sun altitude which is determined by the time and the latitude which expresses the position. Namely, the transmission distance of the ozone layer can be determined from the sun altitude, and the damping at each wavelength can be known, and the erythema ultraviolet ray amount at an arbitrary sun altitude can be determined.

Note that, if a damping constant per wavelength is known in advance, a specific ultraviolet ray amount (specific ultraviolet ray information) can be estimated from the relationship between the actually measured value and the sun altitude, without being limited to the erythema ultraviolet ray amount.

For example, the erythema ultraviolet ray amount with respect to the erythema curve shown in FIG. 1 is generally expressed as follows, because the UV index is the integration of one hour.

erythema ultraviolet ray amount=erythema curve× solar ultraviolet ray spectral illuminance×3600 seconds     formula (7)

Accordingly, the erythema ultraviolet ray amount at an arbitrary sun altitude is determined as follows.

erythema ultraviolet ray amount=sun altitude correction factor×erythema ultraviolet ray amount determined by correcting actually measured value     formula (8)

Here, the sun altitude correction factor=a constant×the erythema factor (sun altitude).

Therefore, in accordance with the geographical region where the person taking the measurement lives (latitude information) and the date and time, the erythema ultraviolet ray amount can be determined from the actually measured value of the ultraviolet rays of the sun (the entire ultraviolet ray amount), and the UV index also can be determined. Note that the fluctuations in the ozone density in Japan are about ±10% in the period of a year.

Computation of Sun Altitude

The sun altitude (zenith angle Z) is determined as follows.

$$\cos Z = \cos D' \cos L' + \sin D' \sin L' \cos H \quad \text{formula (9)}$$

Here, L' is the colatitude (the complementary angle of latitude L) of the person carrying out observation, D' is the polar distance angle (the complementary angle of the declination D), and H is the hour angle.

The polar distance angle D' is determined as follows.

$$\cos D' = \sin 23.5° \sin \alpha \quad \text{formula (10)}$$

Here, α is the angle formed by the line connecting the earth and the sun on the object day, and the line connecting the earth and the sun at the vernal equinoctial point of that year, and α=n360°/365.25 (where n is the number of days counted from the vernal equinox).

Moreover, the hour angle H is determined as follows.

$$H = \pm 360° \cdot t/24 \text{ hours} \quad \text{formula (11)}$$

Here, t is the time from the time of southing. A negative sign expresses that it is before southing.

With regard to these information, the date and time can be obtained from a clock function of the date and the time. Further, in the case of a limited geographical region of living, a latitude which is set in advance can be inputted as the position information. Or, the position information can be known at any time by a position measuring device in accordance with artificial satellites.

Computation of Sun Altitude Correction Factor C (Effect of Ozone Absorption on Sun Altitude)

First, given that the sun altitude is θ (angle of elevation) the radius $r_0$ of the earth is 6400 km, the upper limit height of the ozone layer is $r_2$, and the lower limit height of the ozone layer is $r_1$, the ozone layer transmission distance x(θ) is expressed as follows.

$$x(\theta) = -r_0 \sin(\theta) + \sqrt{(r_0 \sin(\theta))^2 + (r_2^2 + 2r_2 r_0)} - (-r_0 \sin(\theta) + \sqrt{(r_0 \sin(\theta))^2 + (r_1^2 + 2r_1 r_0)}) \quad \text{formula (12)}$$

Given that $r_1$=20 km and $r_2$=40 km, the transmission distance is, as a function of the sun altitude, for example x(80°)=20.3 km, x(30°)=39.47 km, x(15°)=72.75 km, x(0°)=210.3 km.

From the transmission distance, the amount of damping of ultraviolet rays by absorption is generally as follows.

$$I = I_0 \exp(-kx(\theta)) \text{ (where } k \text{ is an absorption factor)} \quad \text{formula (13)}$$

Therefore, given that the scattering absorption factor of the total UV is k(λ), the absorption factor in the ozone layer of the UVB region is k(λb) (the absorption factor in layers other than UVB is the same as that for the total UV), and the incidence intensities onto the stratosphere are total UV: $I_0(\theta)$ and UVB: $Ib_0(\theta)$, $$Ib(\theta)=Ib_0\exp(-k(\lambda b)x(\theta))\times\exp(-k(\lambda)x(\theta)) \qquad \text{formula (14)}$$

$$I(\theta)=I_0\exp(-k(\lambda)x(\theta)) \qquad \text{formula (15)}$$

The ratio of UVB and UV in accordance with the sun altitude is expressed as follows.

$$C=Ib(\theta)/I(\theta)=(Ib_0/I_0)\exp(-k(\lambda b)x(\theta)) \qquad \text{formula (16)}$$

The effects of ozone absorption on the sun altitude (the absorption effect ratio due to ozone), i.e., the sun altitude correction factor C, is determined, and correction of the erythema ultraviolet ray amount E in accordance with the sun altitude can be carried out.

Here, $(Ib_0/I_0)$ and $k(\lambda b)$ can also be determined by comparing a measured value of a different solar spectral irradiance of the sun altitude.

Hereinafter, an example in which the erythema ultraviolet ray amount E is determined from an actually measured value and the UV index is determined, will be described concretely, and an example of correcting the erythema ultraviolet ray amount E in accordance with the sun altitude will also be described concretely.

Here, solar ultraviolet rays are measured by using an ultraviolet ray measuring element utilizing a polycrystalline gallium nitride semiconductor (the ultraviolet ray measuring element used in the "UV caremate" manufactured by Fuji Xerox Co., Ltd.), and actually measured value UV0 is determined. The spectral sensitivity of the ultraviolet ray measurement is measured by using a calibrated light source (see FIGS. 1 and 2). Further, the solar spectrum in summer is measured from 290 nm to 500 nm by using spectrometer MP11 manufactured by Hamamatsu Photonics KK (see FIGS. 1 and 2).

Figure 2:
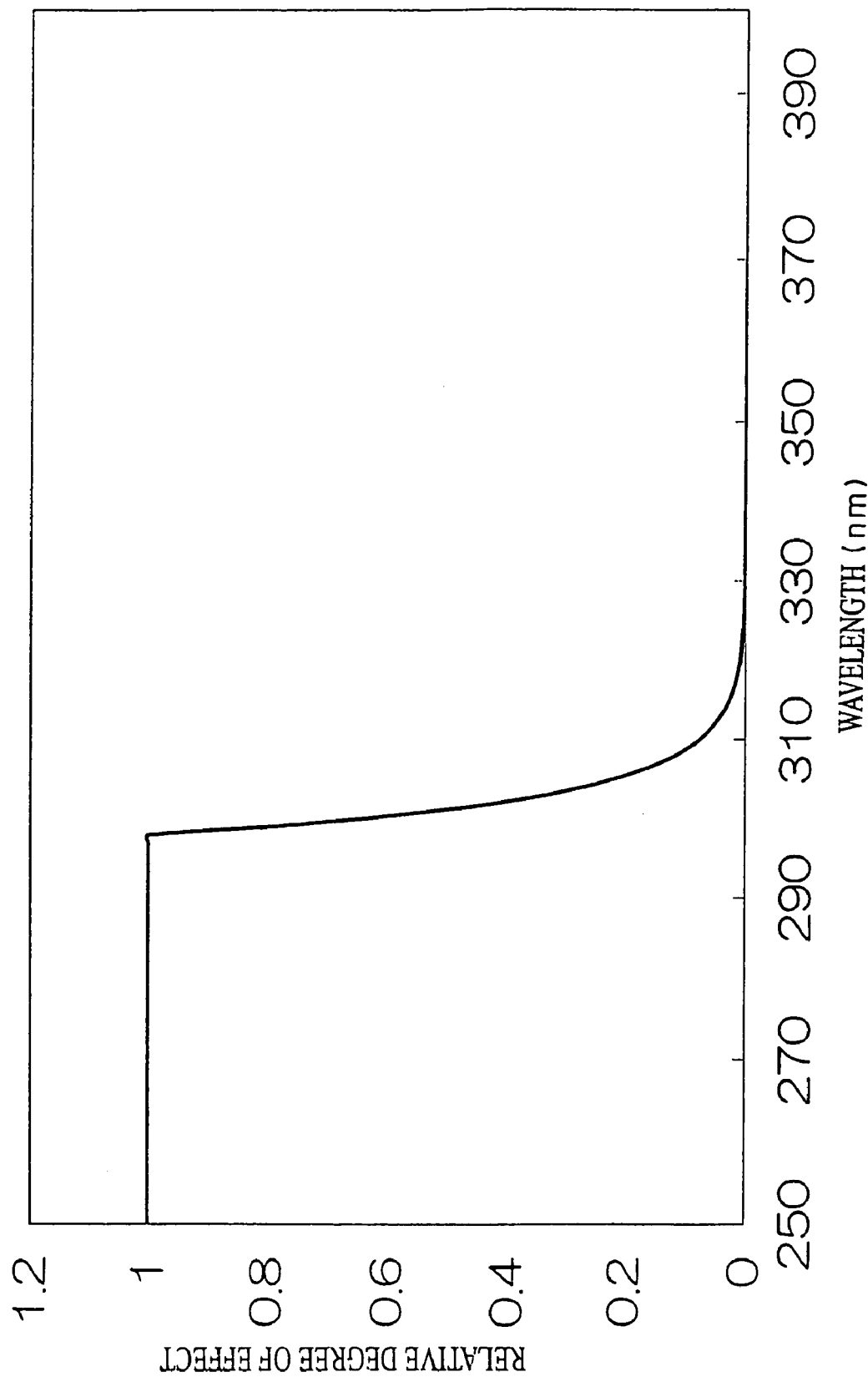
FIG. 2 is a graph showing the relationship between ultraviolet ray wavelength and relative degree of effect, that is the erythema curve, relating to the embodiment of the present invention.

First, from FIGS. 1 and 2, on the basis of above formulas (2) and (5), the ratio of estimated value UV1, which is estimated from the solar spectrum and the spectral sensitivity of the ultraviolet ray measuring device (element), and estimated value UVE of the erythema ultraviolet ray amount, is determined as UVE/UV1=0.006.

Then, correction of the actually measured value UV1 by UVE/UV1 is carried out, and the erythema ultraviolet ray intensity E is determined on the basis of above formula (6). When the erythema ultraviolet ray intensity E is converted into an ultraviolet ray amount of a period of one hour, E is 108 mJ/cm² at the time UV0 is 5000 μW/cm². As a result, it is determined that the UV index is 11.

Next, correction in accordance with the sun altitude information is carried out on the erythema ultraviolet ray amount E. Here, horizontal data of the Electrotechnical Library in Tanashi, Japan at UVB in the wavelength range of 310 to 300 nm, a lot of which is included in the erythema curve, is used as the UVB/UV ratio for summer and winter. The illuminance of the entire 300 to 400 nm is used for the UV.

Near the summer solstice (75°, Jun. 23, 1979), $$Ib(75)=Ib_0\exp(-k(\lambda b)x(75))\times\exp(-k(\lambda)x(75)) \qquad \text{formula (17)}$$

$$I(75)=I_0\exp(-k(\lambda)x(70)) \qquad \text{formula (18)}$$

$$Ib(75)/I(75)=0.0132=(Ib_0/I_0)\exp(-k(\lambda b)x(75)) \qquad \text{formula (19)}$$

Near the winter solstice (30°, Dec. 22, 1979), $$Ib(30)=Ib_0\exp(-k(\lambda b)x(30))\times\exp(-k(\lambda)x(30)) \qquad \text{formula (20)}$$

$$I(30)=I_0\exp(-k(\lambda)x(30)) \qquad \text{formula (21)}$$

$$Ib(30)/I(30)=0.0048=(Ib_0/I_0)\exp(-k(\lambda b)x(30)) \qquad \text{formula (22)}$$

The transmittance distance at 75° and the transmittance distance at 30° are determined as follows.

$$\ln(0.0132/0.0048)=(-k(\lambda b))(x(75)-x(30)) \qquad \text{formula (23)}$$

From the above, the absorption factor $k(\lambda b)$ at the ozone layer of the UVB region is $$\begin{aligned}-k(\lambda b)&=\ln(0.0132/0.0048)/(x(75)-x(30)) \qquad \text{formula (24)}\\ &=1.0116/(-18.8\text{ km})=-0.0538/\text{km}\end{aligned}$$

Further, $Ib_0/I_0$ is determined as follows.

$$\begin{aligned}Ib_0/I_0&=0.0132/\exp(-k(\lambda b)x(75)) \qquad \text{formula (25)}\\ &=0.0132/\exp(-0.0538\times 20.7)=0.0402\end{aligned}$$

This shows that, outside of the stratosphere, UVB of 300 to 310 nm is 4% of all of the ultraviolet rays.

As a result, the ratio of UVB and UV at an arbitrary sun altitude θ is expressed as follows.

$$C=Ib(\theta)/I(\theta)=(0.0402)\exp(-0.0538\times x(\theta)) \qquad \text{formula (26)}$$

Next, given that the radius $r_0$ of the earth is 6400 km, the upper limit height $r_2$ of the ozone layer is 40 km and the lower limit height $r_1$ of the ozone layer is 20 km, the ozone layer transmission distance $x(\theta)$ with respect to the sun altitude θ (angle of elevation) is determined on the basis of above formula (12), and, with respect to the erythema ultraviolet ray amount E of that day which is determined from the actually measured value UV0 at the point in time of a southing altitude of 75°, for example, at a sun altitude of 30°, because the transmission distance is 40 km, the sun altitude correction factor C is 0.49, and at a sun altitude of 50°, because the transmission distance is 26 km, the sun altitude correction factor C is 0.8.

Therefore, if, on the same day of observation, the sun altitude is the time of 30°, it is determined as actually measured value UV1×0.006(UVE/UV1)×0.36. For example, the UV index at the time when the observed value is 5000 μW is 4.

Hereinafter, the embodiment of the present invention will be described in further detail with reference to the drawings. Note that structures having substantially the same functions are described by being denoted by the same reference numerals throughout all of the drawings, and description thereof may be omitted depending on the case.

Figure 3:
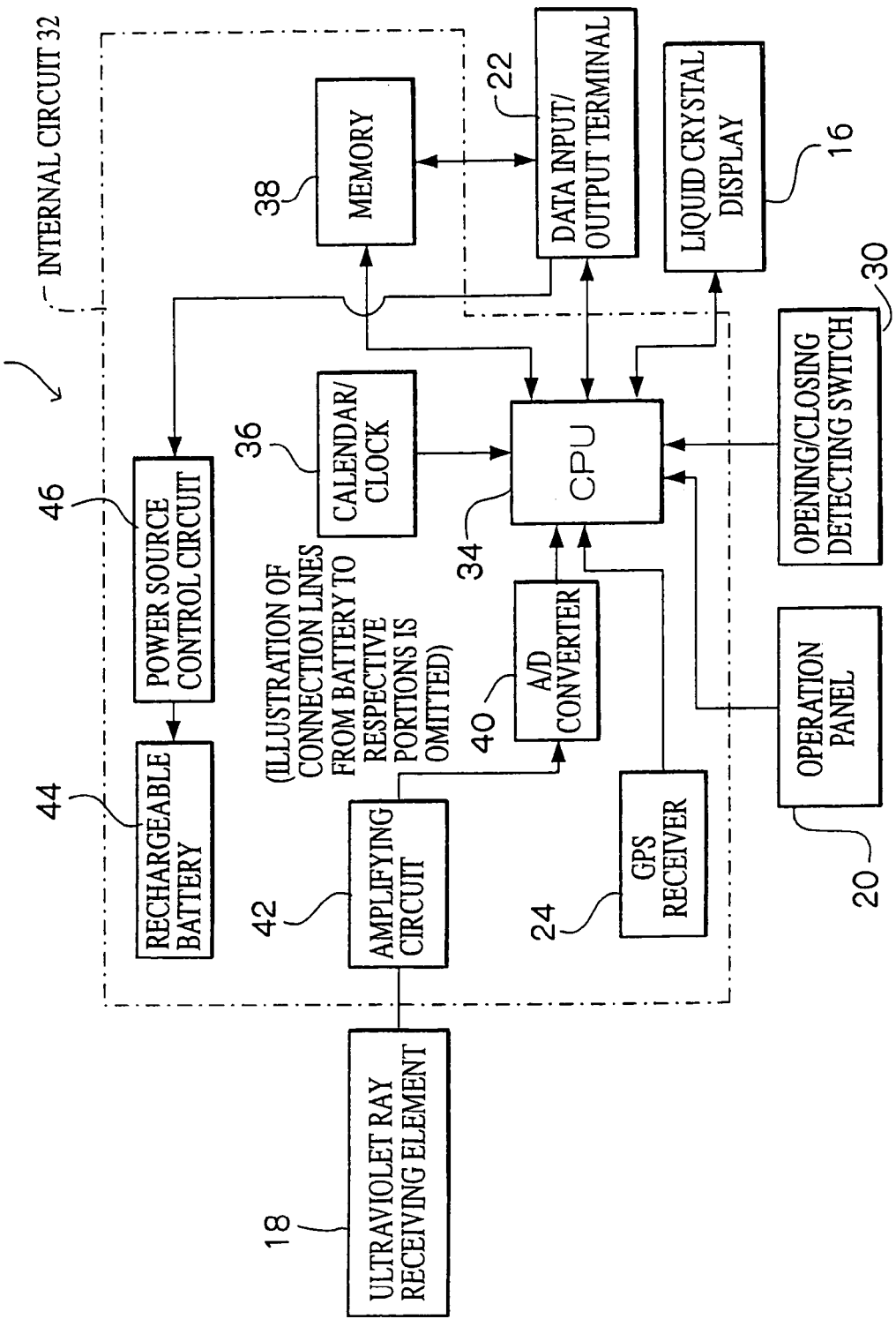
FIG. 3 is a schematic structural view showing the structure of an ultraviolet ray measuring device relating to the embodiment of the present invention.

FIG. 3 is a schematic structural drawing showing the structure of an ultraviolet ray measuring device relating to the embodiment of the present invention.

An ultraviolet ray measuring device 10 of the present embodiment includes a liquid crystal display 16 serving as a display mechanism which displays various types of information, an ultraviolet ray receiving element 18 which senses ultraviolet ray information as a physical amount of ultraviolet rays, an operation panel 20 (e.g., a power switch, a mode switching switch, a setting switch, or the like) serving as an operation mechanism by which the user of the ultraviolet ray measuring device 10 inputs various types of information, and a data input/output terminal 22 enabling output of ultraviolet ray information expressing the ultraviolet ray intensity measured by the ultraviolet ray measuring device 10, and input of various types of information from an information terminal device.

An ultraviolet ray receiving element, in which the visible portion of a photodiode or the like of GaP or Si or the like having sensitivity in the visible region is cut by a filter, can be used as the ultraviolet ray receiving element 18. Or, an ultraviolet ray receiving element structured by an oxide semiconductor of titanium oxide, zinc oxide, or the like can be used. An ultraviolet ray receiving element structured by a nitride compound semiconductor can be used as the ultraviolet ray receiving element 18. Ultraviolet ray receiving elements structured by nitride compound semiconductors are advantageous in that they have a fast photoresponse, the absorption region thereof can be adjusted in accordance with the composition, they are compact and thin and do not require excessive space at a display portion, and the like, as well as being excellent in terms of design such as color and the like.

However, in the present embodiment, because the contribution of scattering in solar ultraviolet rays is great, it is preferable that the ultraviolet ray receiving element 18 have an incident angle characteristic which matches the law of cosines. This is because, in order for the scattering factor to be expressed by Rayleigh's law, scattering factor=constant/(wavelength)$^4$, and during fine weather, at 340 nm and 300 nm, it is 1.7 times at the latter, and as compared with 500 nm, the ultraviolet rays have a scattering factor of from 5 times to 8 times and the effect of scattering is great.

The SEK1054B, which is a display module manufactured by Seiko Epson Corporation, is used as the liquid crystal display 16. This display module is a dot-matrix-type liquid crystal display module, and can display arbitrary information on a display surface of 96 dots×32 dots. Characters, graphs, and the like can be displayed thereon. For example, a simple graph can be displayed then and there after measuring, and the illuminance distribution and the like can be confirmed intuitively without outputting the data to an unillustrated external input/output device. The display mechanism is not limited to this, and all types of displays, such as other liquid crystal displays, organic EL displays, plasma displays, CRT displays, and the like can be used.

An internal circuit 32 is provided at the ultraviolet ray measuring device 10. The internal circuit 32 is structured so as to include a CPU 34 (correcting mechanism) serving as a central processing unit which governs the overall operations of the ultraviolet ray measuring device 10, a memory 38 serving as a storage mechanism which stores various types of information, an analog/digital converter 40 (hereinafter called "A/D converter") which converts an inputted analog signal into digital data, and outputs the digital data, an amplifying circuit 42 amplifying an inputted analog signal, a rechargeable battery 44 which supplies electric power for driving to the respective portions of the internal circuit 32, and a power source control circuit 46 for controlling the voltage and the like at the time of charging the rechargeable battery 44. Note that, in order to avoid complicating FIG. 3, the connection lines showing the paths of supply of electric power from the rechargeable battery 44 to the respective portions are omitted from illustration.

The internal circuit 32 includes, as sun altitude acquiring mechanism, a global positioning system (GPS) receiver 24 which acquires positional information, and a calendar/clock 36 which clocks the date and time.

The GPS receiver 24 is connected to the CPU 34. An antenna (not illustrated), which receives radio waves from plural satellites (generally, four satellites) circling the earth is incorporated within the GPS receiver 24. The GPS receiver 24 receives radio waves by the antenna, and determines the periods of time until the radio waves arrive thereat, and computes the distances therefrom to the respective satellites, so as to thereby acquire positional information (in the present embodiment, the one-dimensional information of the latitude). Therefore, the CPU 34 can at any time know of the positional information.

The calendar/clock 36 is connected to the CPU 34. The CPU 34 can at any time know of the date and time information (the month, the day, and the time) which is clocked by the calendar/clock 36. Note that the calendar/clock 36 may be incorporated within the CPU 34, and similar operations may be realized by software.

The memory 38 is connected to the CPU 34. The CPU 34 can write and read various types of information to and from the memory 38. Further, the liquid crystal display 16 is connected to the CPU 34. The CPU 34 can make various types of information be displayed on the liquid crystal display 16. The respective switches of the operation panel 20 are connected to the CPU 34, such that the CPU 34 can at any time sense the states in which the respective switches are depressed by the user.

On the other hand, the sensor output terminal of the ultraviolet ray receiving element 18 is connected to the input end of the A/D converter 40 via the amplifying circuit 42. The output end of the A/D converter 40 is connected to the CPU 34.

The data input/output terminal 22 is connected to the CPU 34. The CPU 34 can carry out the input and output of various types of information via the data input/output terminal 22. Note that, in addition to being connected to the CPU 34, the data input/output terminal 22 is connected directly to the memory 38. In this way, via the data input/output terminal 22, the ultraviolet ray measuring device 10 can directly write various types of information from the exterior into the memory 38, and can directly read-out various types of information from the memory 38 to the exterior. Further, the data input/output terminal 22 is connected also to the rechargeable battery 44 via the power source control circuit 46. In this way, the ultraviolet ray measuring device 10 controls the voltage and the like at the power source control circuit 46, and charging of the rechargeable battery 44 is also carried out via the data input/output terminal 22.

In the ultraviolet ray measuring device 10, the CPU 34 must always be driven stably. In order to drive the CPU 34 by the rechargeable battery 44 as in the present embodiment, a structure which consumes a small amount of electric power and which can obtain a sufficient processing capacity must be used as the CPU 34. Accordingly, in order to address these needs, in the present embodiment, the "H8/3827R" manufactured by Hitachi Semiconductor is used as the CPU 34. The "H8/3827R" has incorporated therein a program for computation and a volatile memory for temporary storage, as well as an analog/digital converting circuit (corresponding to the A/D converter 40 in the drawings). In this way, the number of parts can be reduced, and the device can be made to be both less expensive and more compact.

For example, the 24LC256 which is a storage element of Microchip Technology (USA) can be used as the memory 38. This storage element, although compact, has a large capacity, and therefore, the ultraviolet ray measuring device 10 can be made to be compact.

Here, description will be given of the contents which are stored in the memory 38 of the ultraviolet ray measuring device 10.

A header portion which is a portion for storing various types of information relating to the measured data (the ultraviolet ray intensity), a measured data portion which is a portion for storing actually measured data, a program data portion which is a portion for storing programs for computation, and a set value portion which is a portion for storing various types of set values, are provided in the memory 38. Programs for various types of computation based on the above formulas (e.g., formula (6), formula (8), formula (26) and the like), and various types of set values (e.g., the estimated value UV1 of the entire region, the estimated value UVE of the erythema ultraviolet ray region), which programs and set values are for carrying out the above-described correction of the actually measured values determining the erythema ultraviolet ray amount and the UV index, and correction of the erythema ultraviolet ray amount in accordance with the sun altitude information, are stored in the program data portion and the set value portion.

Note that, in the present embodiment, in order to prevent leaking of measured data to the exterior, the measured data is stored in the measured data portion after being encoded by a predetermined encoding method. The information and the like showing the encoding method at this time are stored in the header portion. Note that the encoding method is not particularly limited, and any of various techniques can be appropriately selected.

Next, operation of the ultraviolet ray measuring device 10 at the time of measuring ultraviolet rays will be described with reference to FIG. 4. Note that FIG. 4 is a flowchart showing the flow of the ultraviolet ray measuring processing executed at the CPU 34.

Figure 4:
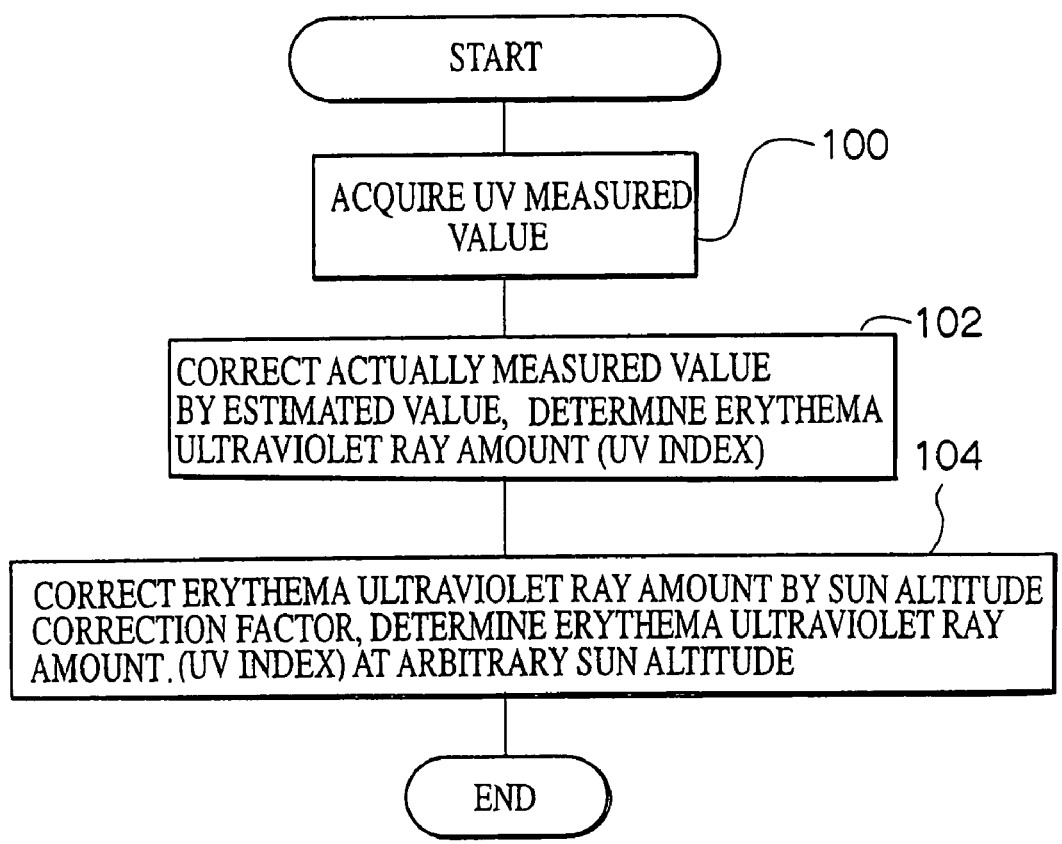
FIG. 4 is a flowchart showing the flow of ultraviolet ray measuring processing of the ultraviolet ray measuring device relating to the embodiment of the present invention.

In step 100 of FIG. 4, ultraviolet ray measurement is carried out by the ultraviolet ray receiving element 18. The measured value of the ultraviolet ray amount (the UV measured value) is obtained, and the acquired information (the actually measured value) is stored in a free region of the measured data portion of the memory 38. Then, the routine proceeds to step 102.

In step 102, the information acquired in step 100 (the actually measured value UV0), the estimated value UV1 of the entire region which is estimated from the solar spectrum and the spectral sensitivity of the ultraviolet ray receiving element 18 which are stored in advance, and the estimated value UVE which is estimated from the erythema curve and the spectral sensitivity of the ultraviolet ray receiving element 18 and the solar spectrum which are stored in advance, are read-out from the memory 38. On the basis of above formula (6), the erythema ultraviolet ray amount E (and the UV index) are determined, and the acquired information is stored in a free region of the measured data portion of the memory 38. Then, the routine moves on to step 104.

In step 104, positional information (latitude information) is acquired from the GPS receiver 24, and the date and time information (the month, date, and time) is acquired from the calendar/clock 36. The information acquired in step 102 (the erythema ultraviolet ray amount E), and the aforementioned various set values for determining the erythema ultraviolet ray amount at an arbitrary sun altitude, are read-out from the memory 38. On the basis of formula (26), the sun altitude correction factor is computed, and on the basis of formula (8), the erythema ultraviolet ray amount E is corrected by the sun altitude correction factor. The erythema ultraviolet ray amount (and the UV index) at an arbitrary sun altitude are determined, and the acquired information is stored in a free region of the measured data portion of the memory 38. Processing then ends.

Note that the information stored in the memory 38 and the acquired information can be displayed on the liquid crystal panel display 16.

The ultraviolet ray measuring device 10 of the present embodiment can be structured so as to be provided integrally with a portable device (e.g., a watch, a mobile phone, a portable email device, a portable navigator, a portable computer).

In this case, the photovoltaic current flowing between the electrodes of the ultraviolet ray receiving element 18 can be fetched. Or, the photoelectric current can be fetched by applying voltage. However, from the standpoint of not consuming the electric power of the portable device, the ultraviolet ray measuring element 18 is preferably a photovoltaic current type.

Further, in the ultraviolet ray measuring device 10 of the present embodiment, the ultraviolet ray receiving element 18 may be adhered to the reverse side of a window material provided on a display element of the portable device, or may be provided between the window material and the display element surface. Or, the ultraviolet ray receiving element 18 may be adhered to the display element surface, or may be set at a place where its own independent window of incidence is provided.

In the ultraviolet ray measuring device 10 of the present embodiment, the positional information is acquired by the GPS receiver 24. However, the present invention is not limited to the same. Arbitrary positional information may be stored in advance in the memory 38, and the desired positional information may be read-out in accordance with a designation from the user. Or, the positional information may be acquired by using a personal handy-phone system (PHS).

It should be obvious that the above-described embodiment is not to be interpreted as limiting, and can be realized within the scope of satisfying the necessary conditions of present invention.

The present invention can thus provide an ultraviolet ray measuring method and an ultraviolet ray measuring device which make it possible to always easily and conveniently measure specific ultraviolet ray information with respect to a specific action curve from an actually measured value of an ultraviolet ray receiving element whose spectral characteristic is known in advance, and which can, at the same time, measure the total ultraviolet ray amount.

What is claimed is:

1. An ultraviolet ray measuring method using an ultraviolet ray receiving element having a specific spectral sensitivity, the method comprising:
    estimating an estimated value of an entire region from the spectral sensitivity of the ultraviolet ray receiving element and a solar spectral radiation spectrum;
    estimating an estimated value of a specific region from a specific action curve and the spectral sensitivity and the solar spectral radiation spectrum; and
    determining specific ultraviolet ray information by, on the basis of the estimated value of the entire region and the estimated value of the specific region, correcting an actually measured value which is measured by the ultraviolet ray receiving element.

2. The ultraviolet ray measuring method of claim 1, wherein the specific ultraviolet ray information is further corrected on the basis of sun altitude information.

3. The ultraviolet ray measuring method of claim 2, wherein the sun altitude information is determined on the basis of latitude information and date and time information.

4. The ultraviolet ray measuring method of claim 3, wherein the latitude information is determined by a position measuring device in accordance with artificial satellites.

5. The ultraviolet ray measuring method of claim 2, wherein an absorption effect ratio of ultraviolet rays by ozone is included in the sun altitude information.

6. The ultraviolet ray measuring method of claim 1, wherein the specific action curve is an erythema curve.

7. The ultraviolet ray measuring method of claim 6, wherein a UV index is also determined on the basis of the erythema curve.

8. An ultraviolet ray measuring device comprising:
an ultraviolet ray receiving element having a specific spectral sensitivity;
a storage mechanism storing an estimated value of an entire region estimated from the spectral sensitivity of the ultraviolet ray receiving element and a solar spectral radiation spectrum, and an estimated value of a specific region estimated from a specific action curve and the spectral sensitivity and the solar spectral radiation spectrum; and
a correcting mechanism determining specific ultraviolet ray information by, on the basis of the estimated value of the entire region estimated from the spectral sensitivity of the ultraviolet ray receiving element and the solar spectral radiation spectrum, and the estimated value of the specific region estimated from the specific action curve and the spectral sensitivity and the solar spectral radiation spectrum, correcting an actually measured value which is measured by the ultraviolet ray receiving element.

9. The ultraviolet ray measuring device of claim 8, further comprising a sun altitude information acquiring mechanism for acquiring sun altitude information.

10. The ultraviolet ray measuring device of claim 9, wherein the sun altitude information acquiring mechanism acquires latitude information and date and time information as the sun altitude information.

11. The ultraviolet ray measuring device of claim 10, wherein the sun altitude information acquiring mechanism includes a position measuring device in accordance with artificial satellites.

12. The ultraviolet ray measuring device of claim 8, further comprising a display mechanism for displaying various types of information.

13. The ultraviolet ray measuring device of claim 8, further comprising an operation mechanism for input and output of various types of information from a user.

14. The ultraviolet ray measuring device of claim 8, wherein the ultraviolet ray receiving element is formed from a nitride compound semiconductor.

15. The ultraviolet ray measuring device of claim 8, wherein the specific action curve is an erythema curve.

16. The ultraviolet ray measuring device of claim 8, wherein measured data is stored in the storage mechanism after being encoded.

17. The ultraviolet ray measuring device of claim 8, wherein the ultraviolet ray measuring device is provided integrally with a portable device.

* * * * *